United States Patent
Mattocks

(10) Patent No.: US 7,114,735 B2
(45) Date of Patent: Oct. 3, 2006

(54) PARALLELOGRAM SUSPENSION ASSEMBLY WITH BRAKE PORT

(75) Inventor: William Mattocks, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 251 days.

(21) Appl. No.: 10/436,514

(22) Filed: May 13, 2003

(65) Prior Publication Data

US 2004/0227322 A1 Nov. 18, 2004

(51) Int. Cl.
*B60R 9/02* (2006.01)

(52) U.S. Cl. .......................... 280/124.11; 280/124.116

(58) Field of Classification Search ......... 280/124.157, 280/124.128, 124.116, 124.11
See application file for complete search history.

(56) References Cited

U.S. PATENT DOCUMENTS

| 2,970,848 | A | * | 2/1961 | Rice ........................ 280/683 |
| 4,132,432 | A | | 1/1979 | Raidel |
| 4,181,323 | A | | 1/1980 | Raidel |
| 6,322,089 | B1 | | 11/2001 | Dantele et al. |
| 6,416,069 | B1 | | 7/2002 | Ramsey |

* cited by examiner

*Primary Examiner*—Eric Culbreth
(74) *Attorney, Agent, or Firm*—Lathrop & Gage, L.C.

(57) ABSTRACT

A parallelogram suspension assembly for a vehicle with a brake port through the axle seat for positioning of brake components to maximize overall suspension clearance.

16 Claims, 6 Drawing Sheets

PARALLELOGRAM SUSPENSION ASSEMBLY WITH BRAKE PORT

SUMMARY AND BACKGROUND OF THE INVENTION

This invention generally relates to a parallelogram suspension assembly for a vehicle, and more specifically to one having a brake component port through the axle seat. The suspension of this invention is particularly directed to one of a unitized structure wherein all of the operational components of the suspension, including brake components, are provided within the assembly itself. Thus, each of the suspension assemblies of this invention is self-contained, or unitized, such that the entire parallelogram arrangement may be included therewith.

Parallelogram suspensions are known in the art, as are such suspensions which also utilize air springs located rearward of a depending hanger and mounted between an axle seat or beam or the like and the chassis for resiliently supporting the chassis on the axle. Such a suspension is shown in U.S. Pat. No. 4,181,323 to Raidel. Prior to the Raidel patent, such suspensions had not been "unitized" in the sense that all of the operational components of the suspension are contained within each such suspension. The Raidel patent resolved many of the problems with prior art parallelogram suspensions by providing a unitized parallelogram air spring suspension wherein all of the operation components were provided with the suspension and mounted at the end of the axle for easy access and installation while maintaining a compact design resulting in preferred clearance of suspension components and limiting overall suspension weight.

In the parallelogram arrangement of prior art suspensions of this general type, including the Raidel suspension, it has been customary to suspend brake components from a surface of the suspension which significantly reduces overall suspension clearance and affects overall dynamics of suspension operation. Generally, to install the suspensions of this type is was preferable to attach brake cylinders and lines either below the suspension arm or inboard of the suspension arm. It is believed that the parallelogram arrangement of the prior art resulted from problems of space limitations in providing a unitized parallelogram arrangement and brake component location which problems have not heretofore been solved.

The Inventor has solved the problems inherent in brake component placement on parallelogram suspension arms by providing a brake port through the arm between the air springs and adjacent the axle. A brake cylinder, or other brake components, is mounted to the axle, the wheel or at other conventional attachment locations. The brake port is provided at a specific location transversely through the axle seat, substantially adjacent the axle. Generally, the brake components cannot be attached directly to the suspension unit. However, the orientation of the brake port through the axle seat adjacent the axle allows the brake components to project through the port without contacting the periphery of that opening. By placing brake components, such as lines and brake cylinders substantially within the suspension arm itself, spring clearance and ground clearance are maximized.

Generally, the suspension of this invention includes a hanger depending from the vehicle chassis to which the forward ends of at least two vertically spaced torque rods are pivotally mounted. A vehicle axle is rigidly secured to an axle seat having a portion extending forwardly of the axle seat but located rearward of the hanger and a portion extending rearward of the axle seat. Air springs are located rearward of the hanger and mounted between the chassis and the forward and rearward extensions of the axle seat for resiliently resisting axle movement upon loading and unloading of the axle.

The forward portion of the axle seat defines a pocket in which the rearward ends of the torque rods are pivotally mounted, the upper torque rod being offset downwardly to provide clearance from the axle seat. The entire parallelogram arrangement, including fasteners and openings for brake components is unitized as a single assembly along with the other operational components of the suspension while still providing compactness in design.

At least one of the torque rods may be mounted directly to the axle rather than the axle seat. In such an embodiment, it is preferred that at least one torque rod is attached at its forward end to the hanger bracket or chassis and at its rearward end to a bracket mounted to the axle inboard the suspension. In another embodiment, two or more torque rods may be attached to a bracket on the axle rather than to the suspension.

The rearward extension of the axle seat defines a compartment for housing various brake components it is preferable, however, to provide a brake port transversely through the sides of the axle seat so that the brake cylinder, or similar component, can be positioned substantially within the confines of the axle seat but remain accessible for service and replacement. This orientation of the brake components within the port attributes to suspension compactness with full utilization of space. Brake lines and similar component may be fit into the brake port itself or within the compartment(s) of the axle seat. Notches or similar openings may be provided in the periphery of the brake port to accommodate brake lines or brake components.

In this way, the unitized suspension assembly of this invention is particularly unique in its integration and orientation of a brake port within the axle seat structure of a parallelogram suspension.

DETAILED DESCRIPTION OF PREFERRED EMBODIMENTS

Figure 1:
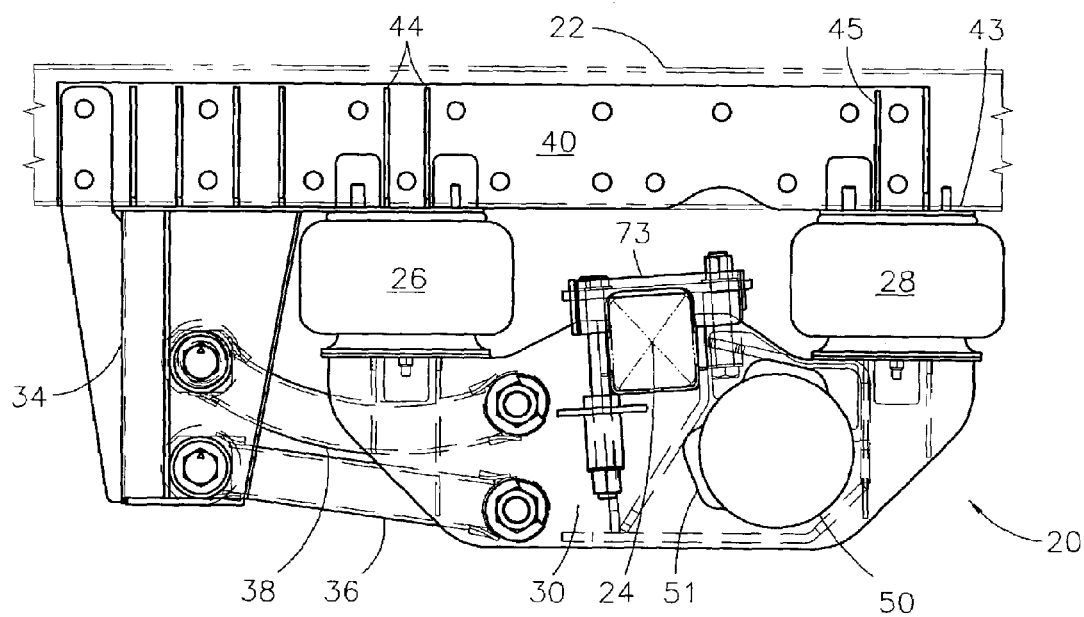
FIG. 1 is a side elevation view of a first embodiment of the suspension assembly of this invention.

Referring generally to FIGS. 1 through 4 of the drawings, there is shown a suspension assembly 20 of this invention which is designed for installation between the chassis 22 of a vehicle and one of its axles 24. Although only a suspension assembly 20 for one side of the vehicle is shown, an identical suspension assembly would be located on the opposite side of the vehicle. It is understood that multiple suspension systems disclosed herein can be used in tandem and that the suspension can be configured for drive axles, steer axles and tag or pusher axles.

The suspension 20 generally includes a front air spring 26 and a rear air spring 28 depending from the chassis 22. An axle seat 30 is mounted between the lower floating ends of the air springs 26 and 28 with the axle 24 rigidly attached thereto. A hanger assembly 34 depends from the chassis 22 at a location forward of the air springs and axle seat and provides a mounting location for the forward ends of a pair of vertically spaced torque rods 36 and 38 which are pivotally connected between the hanger 34 and the forward end of the axle seat 30 to provide a parallelogram linkage between the chassis and axle to maintain the pitch of the axle and axle seat constant during up and down movement thereof upon loading and unloading the axle.

More specifically, the suspension assembly 20 is secured to the chassis 22 by a gusset plate 40 and a plurality of bolts. Alternatively, the gusset plate 40 may be welded to the chassis. A top plate 42 for the front air spring 26 is secured to the gusset plate 40 and has reinforcing webs 44. Bolts are used to attach the front air spring 26 to the top plate 42. The rear air spring 28 is secured to a top plate 43 by bolts with a reinforcing web 45 extending between the gusset plate 40 and top plate 43. The top plate 42 at the front air spring 26 may be the same size as the rear top plate 43 or may be larger to accommodate components and attachment as shown in FIG. 2.

Figure 2:
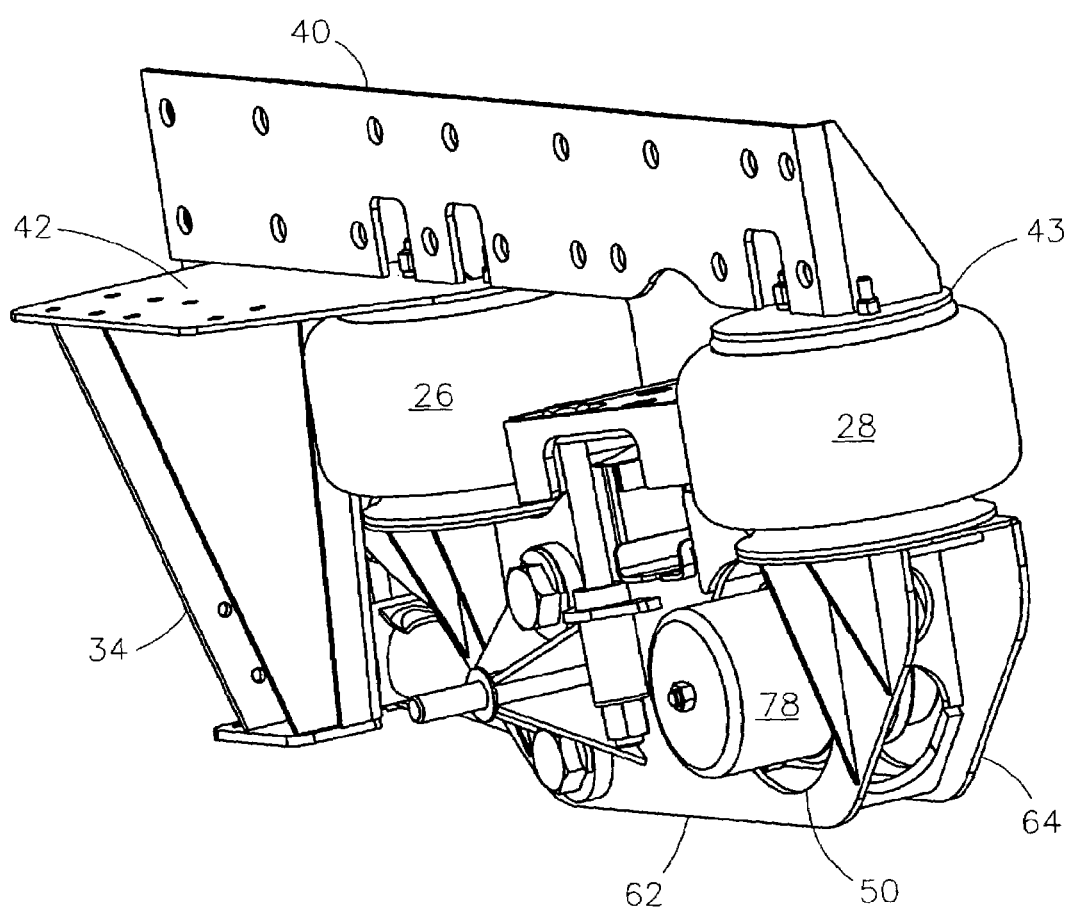
FIG. 2 is a perspective view of the suspension assembly of FIG. 1.
Figure 3:
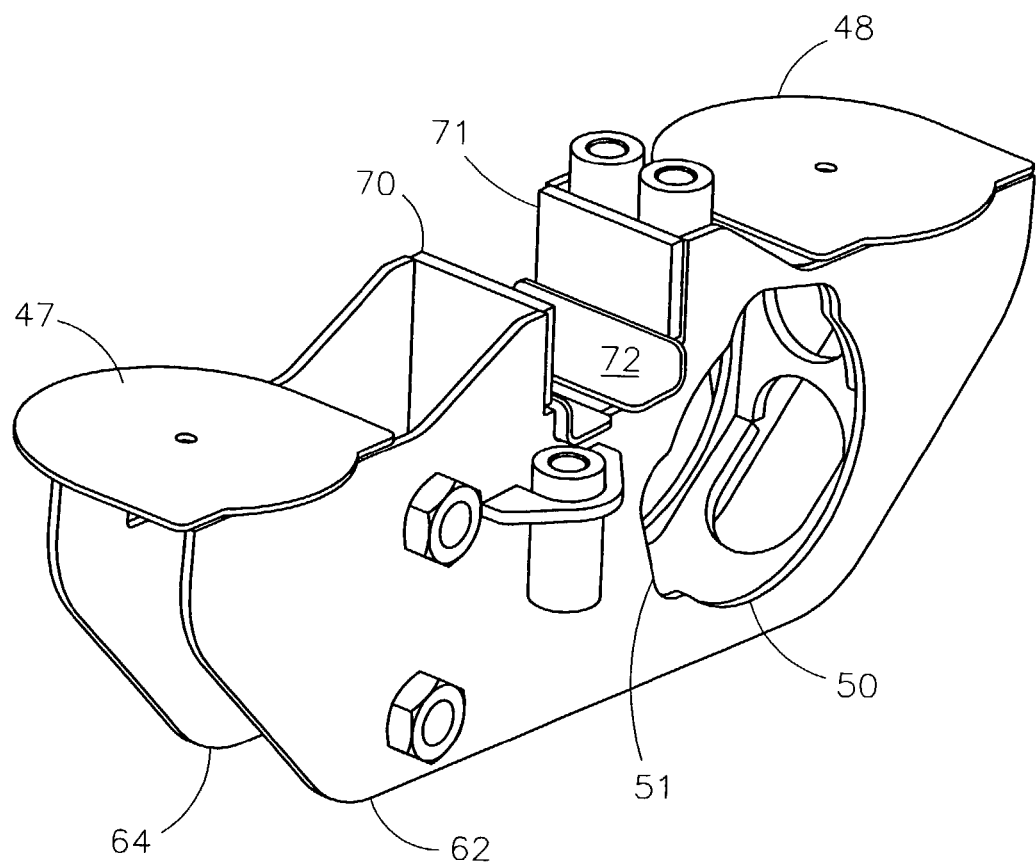
FIG. 3 is a partial view showing the axle seat portion of the first embodiment of this invention.

Referring to FIGS. 2 and 3, the lower ends of the air springs 26 and 28 are mounted to top plates 47 and 48 on the axle seat 30. The axle seat 30 is constructed of two substantially parallel plates 62 and 64 extending generally in the fore and aft direction. The plates 62 and 64 have aligned notches 66 and 68 respectively for receipt of the axle 24 therein, as best shown in FIG. 4.

Figure 4:
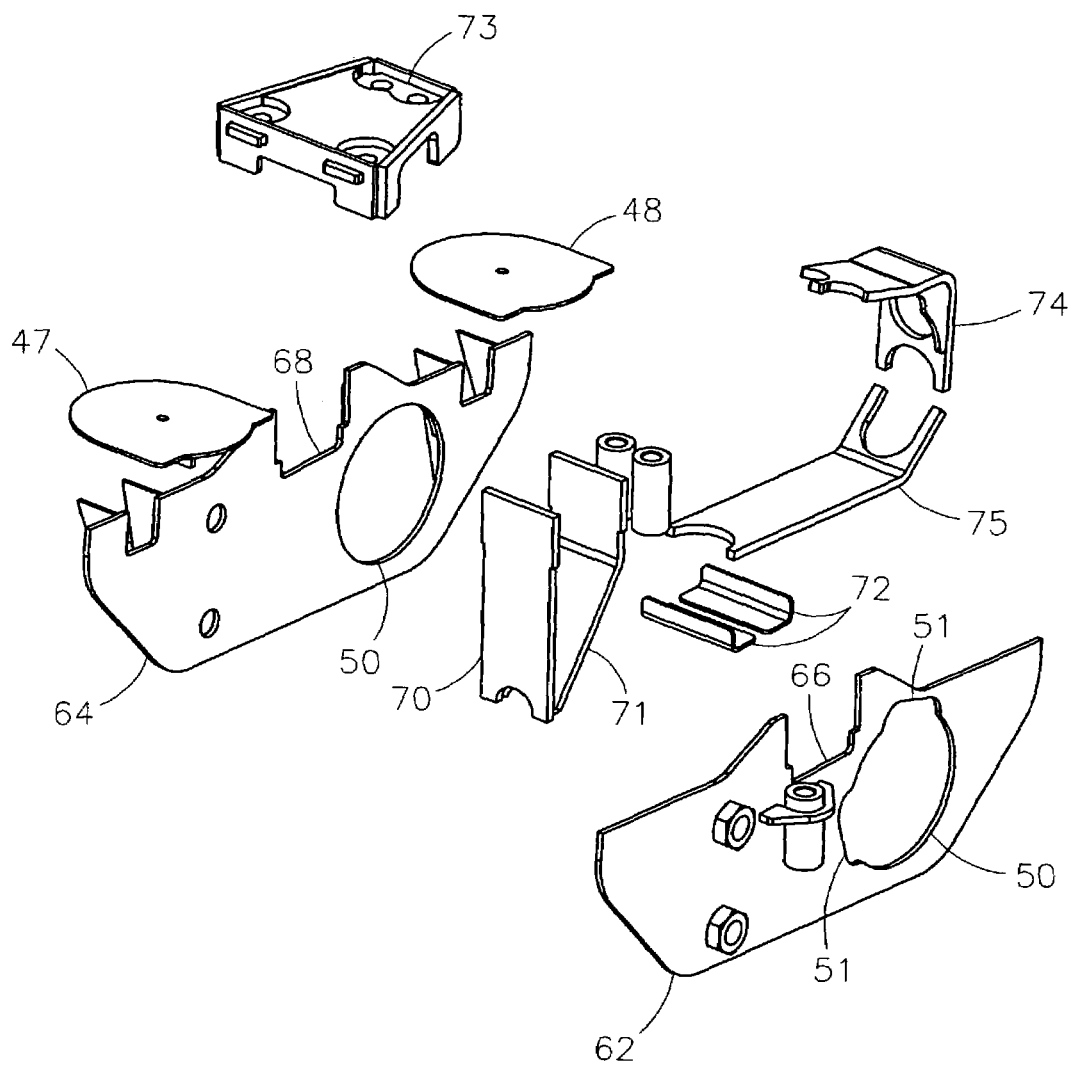
FIG. 4 is a exploded view of the axle seat of the first embodiment of the invention.

Now, referring to FIG. 4, plates 70 and 71 are fixed fore and aft, respectively, of the axle between the parallel plates 62 and 64 and form the attachment point for the vehicle axle. A pair of retainer plates 72 may be fixed between plates 70 and 71 to strengthen and support the axle 24 to axle seat 30 connection. A axle retainer bracket 73 is mountable over the axle 24 to securely fasten the axle 24 between plates 70 and 71 and within the axle seat 30. The combination of plates 72 and the axle retainer bracket 73 forms a "box-like" opening within which the axle 24 is seated.

Further, additional plates 74 and 75 may be inserted between parallel plates 62 and 64 to hold these plates apart in spaced relation. A brake port 50 is axially aligned through parallel plates 62 and 64 and is preferably oriented substantially adjacent the axle seat 30. Stated differently, brake port 50 is bored transversely through axle seat 30. Brake lines and other brake components can also be positioned between parallel plates 62 and 64. Brake components which are too large to fit between the parallel plates 62 and 64, such as the brake cylinder 78, can be mounted adjacent the axle seat 30 and positioned through the brake port 50 to increase overall suspension clearance. At least one line slot 51 may be provided within the periphery of the brake port 50 to accommodate a brake line or similar connection to the brake component housed in the brake port 50. Alternatively, a hole (not shown) may be provided adjacent the brake port through which brake lines are positioned.

The axle seat 30 and axle 24 are given stability by their connection to the hanger 34 through the torque rods 36 and 38. It will be noted that the forward extension of the axle seat 30 from the axle has a substantial vertical dimension to provide a pocket between the parallel plates 62 and 64 forward of the axle for pivotally mounting the rearward ends of the rods 36 and 38 between the plates 62 and 64 by means of bushing assemblies. (not shown).

Figure 5:
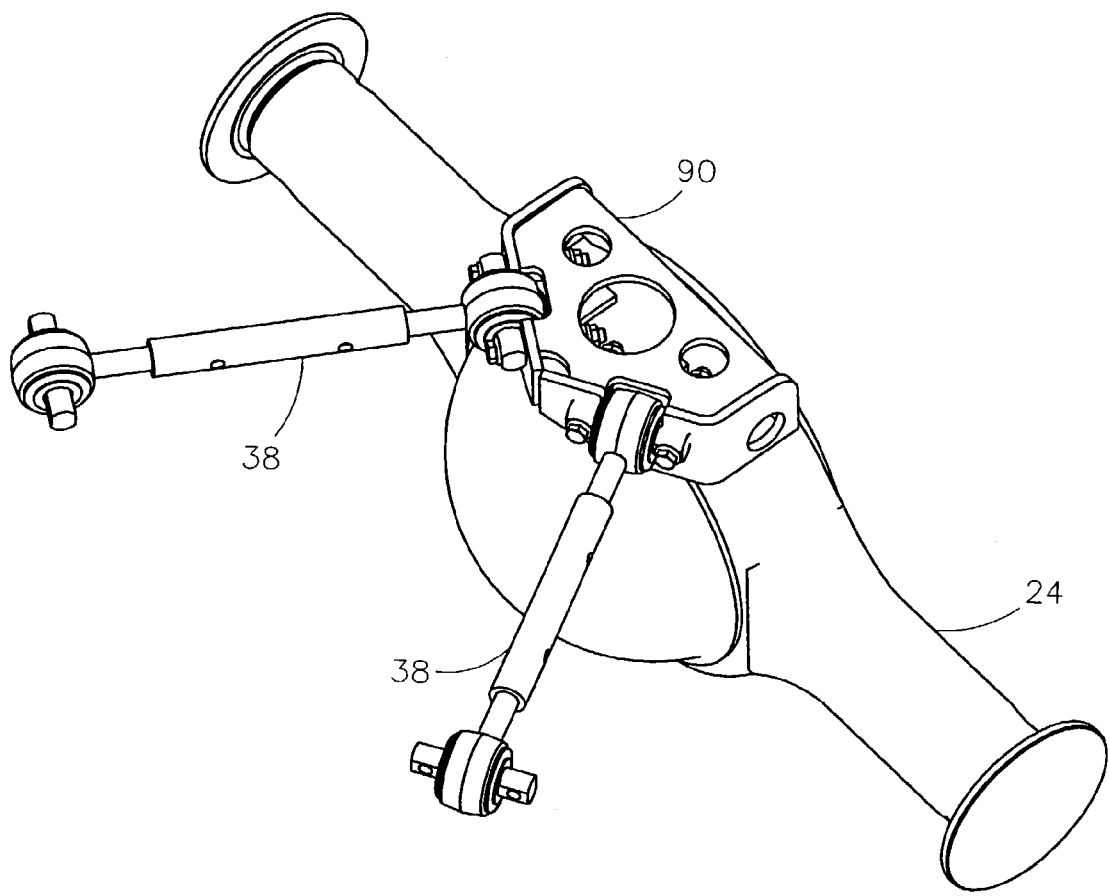
FIG. 5 is a partial perspective view of a second embodiment of the invention.

Referring now to FIG. 5, a second embodiment of the invention is shown. The upper torque rod 38, as shown in FIG. 1, is replaced by a pair of torque rods which are positioned between a bracket 90 on the axle 24 and a hanger or the chassis. The rearward, or second, end of upper torque rods 38 are attached to a bracket 90 mounted directly to the axle 24. The forward, or first, ends of torque rods 38 are attached to a hanger 34 or directly to the chassis (not shown). It is preferred that the rearward ends of torque rods 38 are attached substantially near the middle of the axle 24 and the forward end of the torque rods 38 splayed apart thereby creating an angle to the chassis longitudinal centerline. The combination of the upper torque rods 38 positioned as shown in FIG. 5, and the lower torque rod 36 positioned between the hanger 34 and the axle seat 30, results in a parallelogram configuration.

Figure 6:
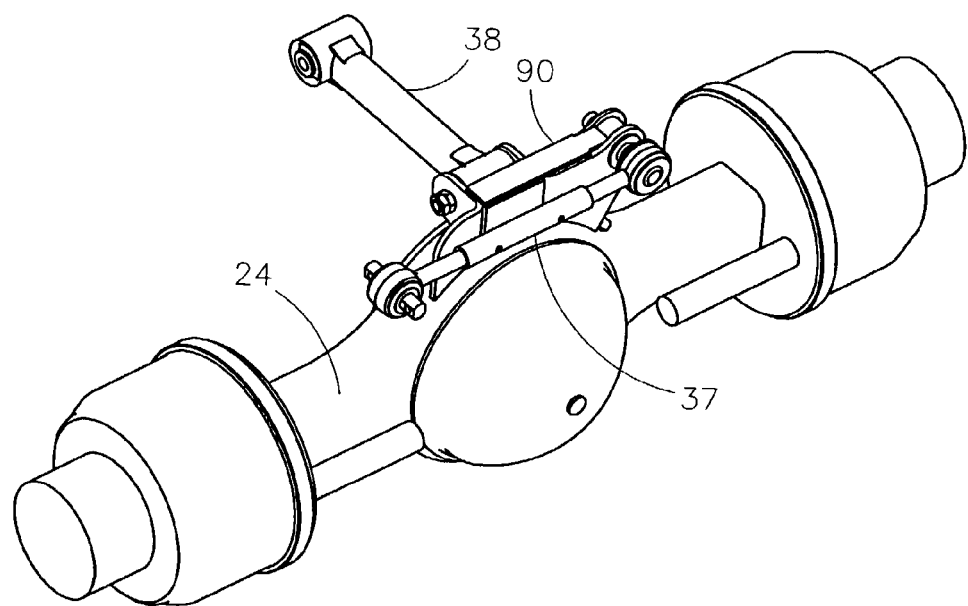
FIG. 6 is a partial perspective view of a third embodiment of the invention.

A third embodiment is shown in FIG. 6 wherein a single upper torque rod 38 is mounted substantially perpendicular to the axle 24, preferably at the midpoint of the axle. The rearward, or second end of the torque rod is attached to a bracket 90 mounted on the axle 24. A secondary torsion rod 37 may be mounted perpendicular to the torque rod 38 and parallel to the axle 24 to reduce lateral travel of the axle. Again, the lower torque arm 36 remains positioned between the hanger 34 and the axle seat 30.

Thus, there has been described a suspension assembly of the parallelogram, air spring type that is self-contained, or unitized, which incorporates a brake port through the side plates or walls of the axle seat which allows brake components to be housed substantially within the suspension assembly itself. This decreases the clearance needed to install the suspension and increases the overall efficiency of the suspension without sacrifice of compactness in design.

There are many changes and modifications which can be made to applicant's device which would be obvious to one of ordinary skill in the art, and which are included in the scope of applicant's invention. It is intended that applicant's invention be limited only by the scope of the claims appended hereto.

What is claimed is:

1. A suspension assembly for supporting a vehicle chassis on a vehicle axle comprising a hanger depending from the chassis and rigidly supported thereto to form a member thereof, an axle seat spaced longitudinally from the hanger, said vehicle axle being rigidly mounted to the axle seat, the axle seat having a portion extending from the axle and toward the hanger and a portion extending from the axle and away from the hanger, a brake port bored through the axle seat for the receipt of brake components, wherein the brake port has at least one line slot within its periphery and the brake port is positioned between the extended portions of the axle seat, air springs are mounted between the extended portions of the axle seat and chassis for resiliently resisting movement of the axle and axle seat during loading and unloading of the axle, and at least one torque rod is mounted between the hanger and said axle seat maintaining the pitch of the axle and axle seat constant during loading and unloading of the axle.

2. The suspension assembly of claim 1 wherein the at least one torque rod further comprising an upper torque rod and a lower torque rod each having one end pivotally mounted to said hanger, the portion of said axle seat extending toward the hanger defining a pocket for receipt of the other ends of said rods, said other ends of said rods being pivotally mounted within said pocket one above the other in spaced vertical relation.

3. The suspension assembly of claim 2 wherein the brake port is located substantially adjacent the vehicle axle.

4. The suspension assembly of claim 2 wherein said brake port is located substantially adjacent the pocket.

5. A suspension assembly for supporting a vehicle chassis on a vehicle axle comprising a hanger depending from the chassis and rigidly supported thereto to form a member thereof, an axle seat spaced longitudinally from the hanger, said vehicle axle being rigidly mounted to the axle seat, the axle seat having a portion extending from the axle and toward the hanger and a portion extending from the axle and away from the hanger, a brake port bored through the axle seat for the receipt of brake components, the brake port having at least one line slot within its periphery, the brake port positioned between the extended portions of the axle seat, air springs mounted between the extended portions of the axle seat and chassis for resiliently resisting movement of the axle and axle seat during loading and unloading of the axle.

6. The suspension assembly of claim 5 further comprising at least one torque rod mounted between the hanger and the axle seat.

7. The suspension assembly of claim 6 wherein the at least one torque rod further comprises at least one upper torque rod mounted between the axle and the vehicle chassis and a lower torque rod mounted between the hanger and the axle seat.

8. The suspension assembly of claim 7 wherein the at least one upper torque rod further comprises a pair of upper toque rods, each having a rearward end attached to the axle and a forward end splayed outboard the rearward end and attached to the vehicle chassis.

9. The suspension assembly of claim 6 wherein the at least one torque rod further comprises an upper torque rod mounted perpendicular to the axle and a lower torque rod mounted between the hanger and the axle seat.

10. The suspension assembly of claim 6 wherein the portion of said axle seat extending from the axle and away from the hanger defines a compartment for housing brake components for the vehicle.

11. The suspension assembly of claim 5 further comprising an upper torque rod and a lower torque rod mounted between the hanger and the axle seat.

12. A suspension assembly for supporting a vehicle chassis on a vehicle axle comprising a hanger depending from said chassis and rigidly supported thereto to form a member thereof, an axle seat spaced longitudinally from the hanger, the vehicle axle being rigidly mounted to the axle seat, said axle seat having a portion extending from the axle and toward the hanger and a portion extending from the axle and away from the hanger, a brake port bored transversely through the axle seat adjacent the axle, the brake port having at least one line slot within its periphery, air springs mounted between the extending portions of the axle seat and the chassis, and at least two parallel rods of approximately the same length, one located above the other and each having one end pivotally mounted to said hanger and its other end pivotally mounted to the portion of said axle seat extending toward the hanger.

13. The suspension assembly of claim 12 wherein the portion of said axle seat extending away from the hanger defines a compartment adjacent the brake port for housing brake components for the vehicle.

14. A suspension assembly for supporting a vehicle chassis on a vehicle axle comprising a hanger depending from said chassis, an axle seat spaced longitudinally from the hanger, the vehicle axle being rigidly mounted to the axle seat, a brake port bored transversely through the axle seat for receipt of brake components, the brake port having at least one line slot within its periphery, an air spring mounted between the axle seat and chassis for resiliently resisting movement of the axle and axle seat during loading and unloading of the axle, and at least one torque rod connecting the axle seat to the hanger.

15. The suspension assembly of claim 14 further comprising at least one torque rod mounted between the axle and the chassis.

16. A suspension assembly for supporting a vehicle chassis on a vehicle axle comprising:
- a hanger depending from the chassis and rigidly supported thereto to form a member thereof,
- an axle seat spaced longitudinally from the hanger, said vehicle axle being rigidly mounted to the axle seat, the axle seat having a portion extending from the axle and toward the hanger and a portion extending from the axle and away from the hanger;
- a brake port bored through the axle seat for the receipt of brake components, wherein the brake port is positioned between the extended portions of the axle seat, and further wherein the brake port has at least one line slot within its periphery;
- air springs mounted between the extended portions of the axle seat and chassis for resiliently resisting movement of the axle and axle seat during loading and unloading of the axle; and
- at least one torque rod mounted between the hanger and said axle seat maintaining the pitch of the axle and axle seat constant during loading and unloading of the axle.

* * * * *